US009251608B2

(12) United States Patent
Chardon et al.

(10) Patent No.: US 9,251,608 B2
(45) Date of Patent: Feb. 2, 2016

(54) DATA VISUALIZATION OF A DATACENTER

(75) Inventors: Luis Chardon, Aguadilla, PR (US); Carlos J. Felix, Isabela, PR (US); Jose Mejias, Aguadilla, PR (US); William J. Navas, Mayaguez, PR (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2220 days.

(21) Appl. No.: 11/742,019

(22) Filed: Apr. 30, 2007

(65) Prior Publication Data
US 2008/0269932 A1 Oct. 30, 2008

(51) Int. Cl.
*G06F 17/00* (2006.01)
*G06T 11/20* (2006.01)
*G06F 17/24* (2006.01)
*G06F 3/0481* (2013.01)

(52) U.S. Cl.
CPC ............ *G06T 11/206* (2013.01); *G06F 3/0481* (2013.01); *G06F 3/04815* (2013.01); *G06F 17/246* (2013.01)

(58) Field of Classification Search
CPC ... G06F 17/246; G06F 3/0485; G06F 3/0483; G06F 3/0481; G06T 11/206
USPC .......... 715/848, 273, 275, 200, 212, 215, 255
See application file for complete search history.

(56) References Cited

U.S. PATENT DOCUMENTS

| | | | | |
|---|---|---|---|---|
| 7,549,070 B2* | 6/2009 | Zwinger et al. | ............... | 713/320 |
| 2001/0019328 A1 | 9/2001 | Schwuttke et al. | | |
| 2003/0158718 A1* | 8/2003 | Nakagawa et al. | ............. | 703/13 |
| 2004/0041846 A1* | 3/2004 | Hurley et al. | ................. | 345/848 |
| 2005/0086612 A1* | 4/2005 | Gettman et al. | ............... | 715/848 |
| 2005/0091596 A1* | 4/2005 | Anthony et al. | ............... | 715/712 |
| 2007/0038414 A1* | 2/2007 | Rasmussen et al. | ............. | 703/1 |
| 2007/0195087 A1* | 8/2007 | Acosta et al. | ................. | 345/424 |
| 2008/0104546 A1* | 5/2008 | Chiu et al. | .................... | 715/848 |
| 2008/0281551 A1* | 11/2008 | Hamann et al. | ............... | 702/132 |

FOREIGN PATENT DOCUMENTS

JP 2003-247012 9/2003

OTHER PUBLICATIONS

Christian Cowan et al. "Monitoring Physical Threats in the Data Center" Jun. 1, 2006; URL=http:searchcio.techtarget.com/whitepaperPage/0,293857, sid 182__gcl11198408,00.html.
Hewlett-Packard Development Company, L.P. et al., PCT Notification of Transmittal of the International Search Report and the Written Opinion of the International Searching Authority, or the Declaration, mailed Aug. 14, 2008, International App. No. PCT/US2008/005348, International filing date: Apr. 24, 2008, 9 p.

* cited by examiner

*Primary Examiner* — Thu Huynh
(74) *Attorney, Agent, or Firm* — Conley Rose, P.C.

(57) ABSTRACT

Methods and systems for data visualization in a datacenter are described herein. At least some illustrative embodiments comprise a method for monitoring a datacenter, comprising collecting a plurality of real-time data samples from a plurality of data sensors, generating a plurality of processed data values based at least in part on the plurality of real-time data samples, mapping each of the plurality of processed data values to one of a plurality of colors, and displaying the plurality of processed data values as regions of color on one or more two-dimensional (2-D) planes within a three-dimensional (3-D) space representing a datacenter.

18 Claims, 7 Drawing Sheets
(2 of 7 Drawing Sheet(s) Filed in Color)

DATA VISUALIZATION OF A DATACENTER

BACKGROUND

As datacenters have increased in size and complexity, so has the need for datacenter-wide environmental monitoring. The increased size of datacenters has brought with it an increase in the complexity of the interaction of environmental parameters affecting the operation of equipment within the datacenters. This sometimes results in complex patterns related to environmental conditions that are not easily predicted or monitored. An example of a parameter that can be difficult to monitor is the heat distribution throughout the datacenter. In large datacenters that use under-the-floor cold air distribution predicting and monitoring the heat load produced by the equipment can be difficult. Changes in heat loading or airflow in just one small area of the datacenter can significantly affect the distribution and flow of air and heat for the entire datacenter. Many other physical and electrical environmental factors (e.g., humidity and power consumption) are also similarly impacted by the size and complexity of today's datacenters.

In order to more accurately track changes in the operating environment of datacenter equipment, datacenter operators have increasingly turned to the use of monitoring sensors and appliances. These devices are installed in the datacenter (within or external to the equipment racks) and provide measured values for a wide variety of physical and electrical environmental parameters within the datacenter. The data provided by such devices may be monitored and displayed either by existing network monitoring software (e.g., HP 0PENVIEVV® by HEWLETT-PACKARD®) or by other dedicated and/or proprietary software designed to work with specific sensors and/or appliances. The data collected is used by the monitoring software to display instantaneous and/or 2-dimensional trend data, and is sometimes used to trigger alarm and/or event notifications if one or more threshold values are exceeded by a monitored parameter. The data presented to operators reflects individual measurements and trends, but may not be very useful to operators in identifying and/or predicting in real-time the types of large scale environmental trends or issues that operators are likely to encounter in today's larger and more complex datacenters. Further, the large number of measurements that need to be monitored in a large datacenter may rapidly subject operators to information overload, creating a substantial risk that an impending or actual failure will go unnoticed.

Other software packages are capable of providing datacenter environmental modeling (e.g., RACKWISE™by VISUAL NETWORK DESIGN), but such software packages are limited to providing generalized calculated environmental predictions (e.g., total power consumption and total required cooling) based on models of the equipment within the datacenter. Still other general purpose fluid/thermal modeling software packages provide 3-dimensional modeling and display of fluid/thermal flows (e.g., FLOW-3D® by FLOW SCIENCE), but these packages are limited to providing theoretical projections of general parameters such as, for example, air flow and temperature variations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct optical, wireless or electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

Figure 1:
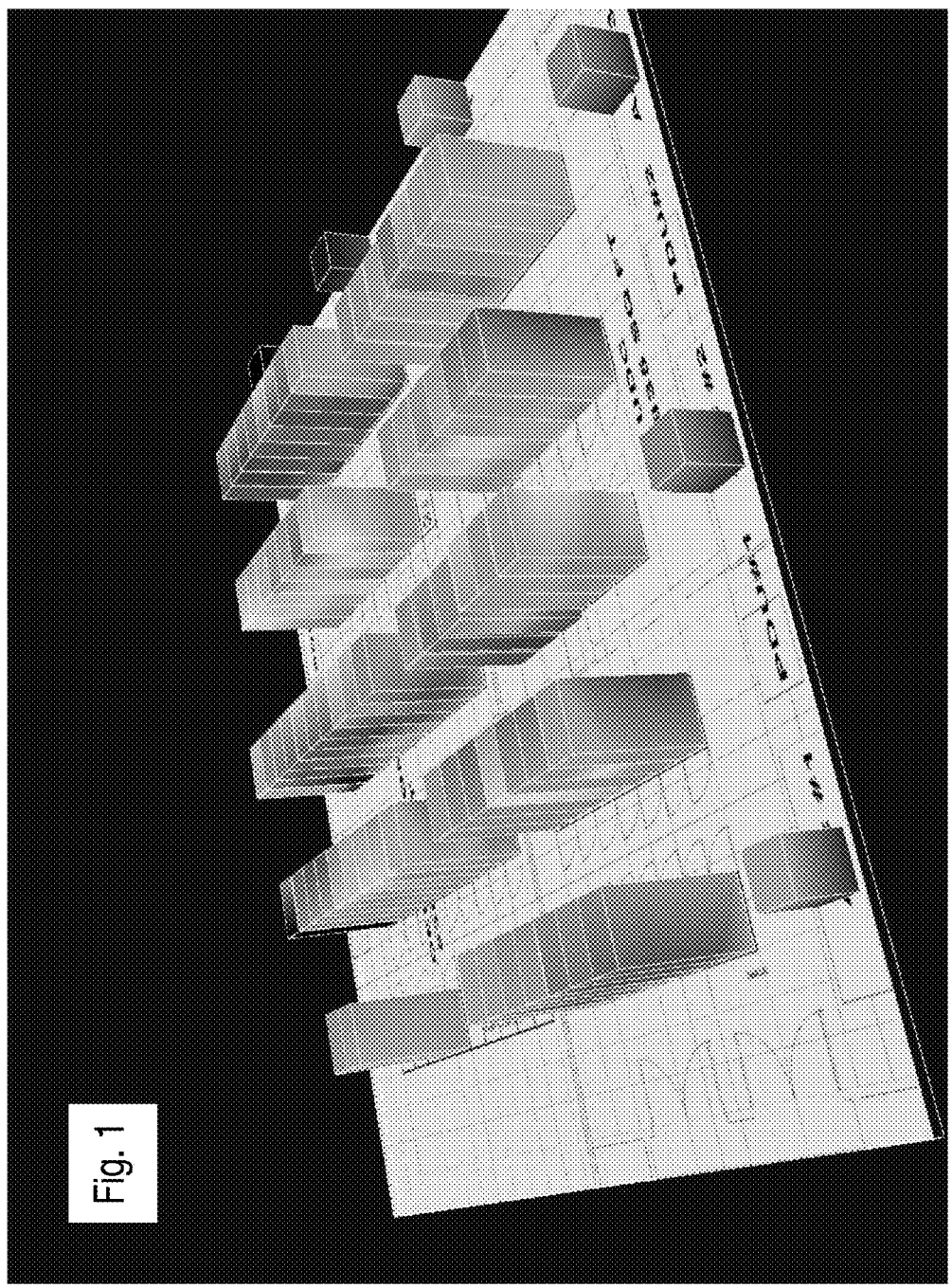
FIG. 1 shows a color 3-dimensional representation of heat distribution within racks of a datacenter, in accordance with at least some illustrative embodiments.

Large datacenters, with large numbers of densely populated equipment racks, can be difficult to monitor and operate. Many physical and electrical environmental parameters (e.g., temperature, humidity, and power consumption) must be monitored and maintained within certain limits throughout the entire datacenter, despite localized differences in operating conditions and continuous changes and interactions between the various parameters. As disclosed herein, a technique for monitoring such a large number of parameters over a large area is to use 3-dimensional (3-D) color visualization to display differences and changes in the monitored parameters. FIG. 1 shows a 3-D color visualization of the heat distribution within the racks of a datacenter, in accordance with at least some illustrative embodiments. Different temperatures are assigned to different colors, allowing the operator to assess the overall heat distribution throughout the datacenter at a glance, and without having to read numerical or graphical readings for individual sensors.

The type of color scheme described is sometimes referred to as "false coloring," due to the fact that the colors are selected to highlight differences between displayed regions or zones and do not necessarily reflect any real physical color of the equipment, process or phenomena being represented. For example, in the illustrative embodiment of FIG. 1 areas that are shown as blue and green are cooler zones, whereas areas showing up as yellow, orange and red are warmer zones. The orange and red zones represent hot zones (at least relatively hot), possibly requiring the operator's attention. The use of red and orange colors helps to highlight the area and focus the operator's attention on a potential problem.

Although the image of FIG. 1 is static, in at least some illustrative embodiments dynamic 3-D images are displayed on a display device (e.g., a computer display such as a cathode ray tube or liquid crystal display). The 3-D images reflect real-time values that are continuously collected from sensors placed throughout the datacenter, processed by a computing system and used to update the 3-D image displayed. Further, the term "3-D image," as used throughout the present disclosure, comprises what is sometimes referred to as "3-D scenes." Such 3-D scenes enable the user to change the viewpoint or position from which a 3-D image is viewed, allowing the user to virtually traverse the environment represented by the 3-D image. Thus, for example, a user could move down an isle between racks in a 3-D scene of a datacenter, taking note of the distribution of a particular parameter (e.g., the heat distribution of each rack), much as an actual technician would walk down a real isle to inspect the operating conditions of real racks within a real datacenter.

Figure 2:
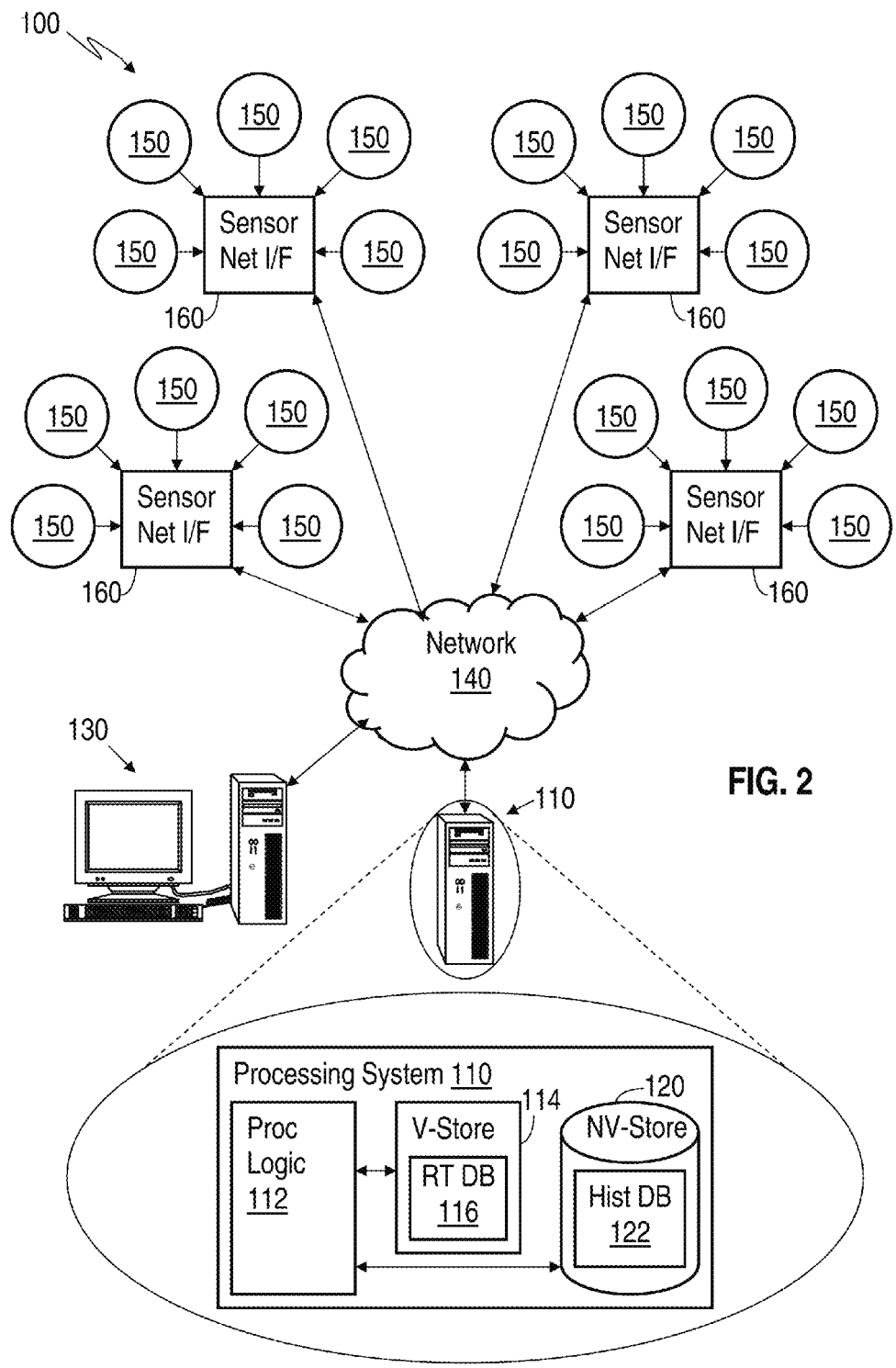
FIG. 2 shows a system for collecting, processing and displaying environmental data using a color 3-dimensional visualization, in accordance with at least some illustrative embodiments.

FIG. 2 illustrates a system 100 for collecting, processing and displaying datacenter sensor data, in accordance with at least some illustrative embodiments. Data is collected from a variety of sensors 150, which each couple to one of several network interface devices (Sensor Net I/F) 160. In at least some illustrative embodiments the sensors comprise temperature, humidity, and air flow sensors. Other sensors capable of monitoring a wide variety of parameters associated with datacenter equipment and operations will become apparent to those skilled in the art, and all such sensors are within the scope of the present disclosure.

Data generated by sensors 150 is forwarded across network 140 by network interface devices 160 to processing system 110. As one of ordinary skill in the art will recognize, any number of data communications protocols may be used to transmit the sensor data (e.g., the simple network management protocol or SNMP), and all such data communication protocols are within the scope of the present disclosure. In at least some illustrative embodiments, processing system 110 serves as a centralized data collection node where the collected data is processed, stored and made available for presentation to a datacenter operator. Processing system 110 comprises processing logic (Proc Logic) 112, which performs at least some of the processing of the sensor data. In at least some illustrative embodiments, processing logic 112 comprises a central processing unit (CPU) that executes software. Processing logic 112 processes the data as it is collected and stored, and further retrieves the stored data for display to the operator as previously described.

The collected and processed data may be stored either in volatile storage or non-volatile storage, or both. In the illustrative embodiment of FIG. 2, for example, real-time data is stored in real-time database 116 maintained within volatile storage device 114 (e.g., random access memory or RAM). Volatile storage device 114 couples to processing logic 112 and provides quick retrieval and/or display of the collected data. Long-term historical data is stored within historical database 122, which is maintained within non-volatile storage device 120 (e.g., a hard disk drive), also coupled to processing logic 112.

Both real-time data from real-time database 114 and historical data from historical database 122, as well as combinations of the two, may be used to produce 3-D images representing the data as shown in the image of FIG. 1. A workstation 130 operated by a datacenter operator, coupled either directly to processing system 110 or indirectly via network 140 (as shown in the illustrative embodiment of FIG. 2), obtains collected data from processing system 110 and display the 3-D images on a workstation display device.

Figure 3A:
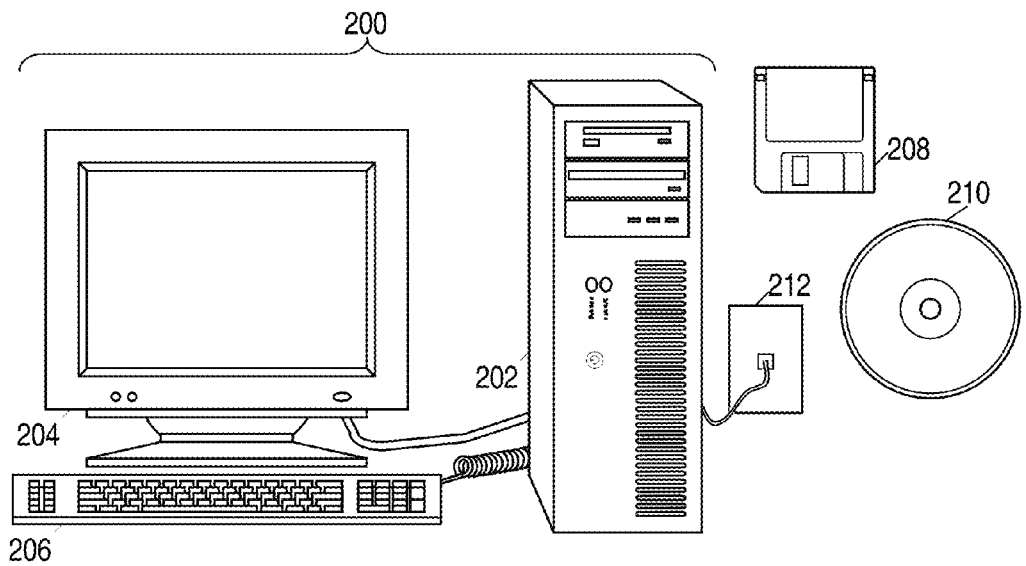
FIG. 3A shows an example of a system configuration, suitable for use as either the processing system or the workstation of FIG. 2, in accordance with at least some illustrative embodiments.
Figure 3B:
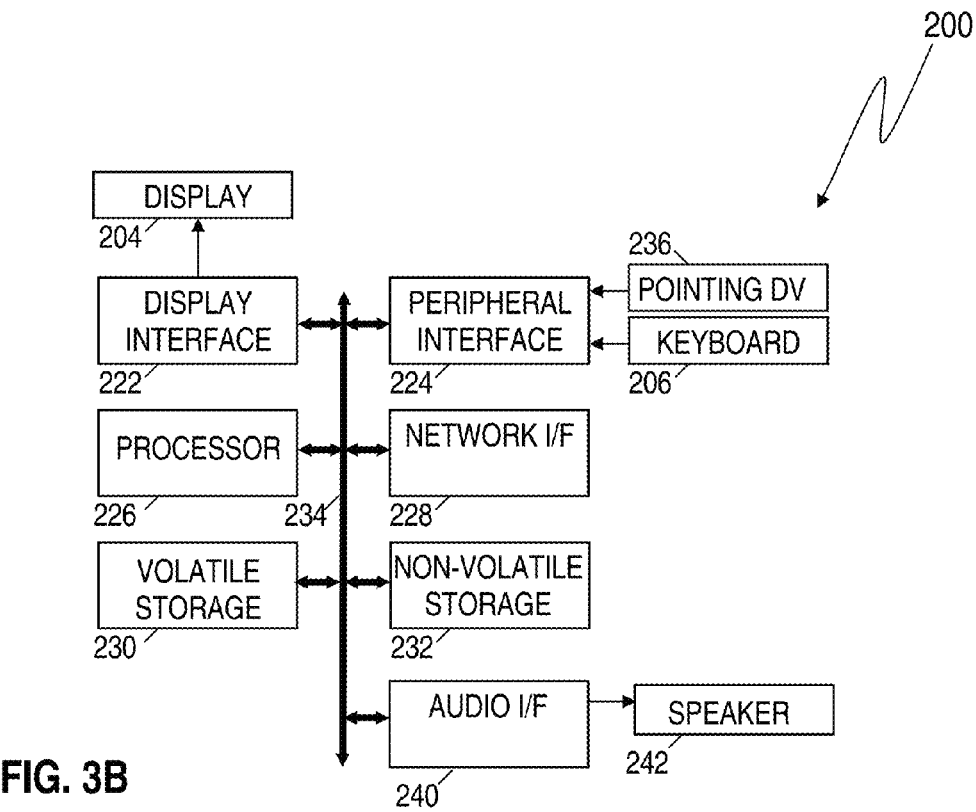
FIG. 3B shows a block diagram of the system configuration of FIG. 3A, in accordance with at least some illustrative embodiments.

FIGS. 3A and 3B show an illustrative system configuration 200 suitable for implementing processing system 110 and workstation 130 of FIG. 2. As shown, the illustrative system configuration 200 comprises a chassis 202, a display 204, and an input device 206. The system configuration 200 comprises a processor 226, volatile storage 230, and non-volatile storage 232. Volatile storage 230 comprises a computer-readable medium such as random access memory (RAM). Non-volatile storage 232 comprises a computer-readable medium such as flash RAM, read-only memory (ROM), a hard disk drive, a compact disk read-only memory (CD-ROM), and combinations thereof.

The computer-readable media of both volatile storage 230 and non-volatile storage 232 comprise, for example, software that is executed by processor 226 and provides both processing system 110 and workstation 130 with some or all of the functionality described herein. The system configuration 200 also comprises a network interface (Network I/F) 228 that enables the system configuration 200 to receive information via a local area network and/or a wired or wireless wide area network, represented in the example of FIG. 3A by Ethernet jack 212. A display interface 222 couples to the display 204. An operator interacts with the station via the input device 206 and/or pointing device 236 (e.g., a mouse), which couples to a peripheral interface 224. The display 204, together with the input device 236 and/or the pointing device, may operate together as a user interface.

System 200 may be a bus-based computer, with the bus 234 interconnecting the various elements shown in FIG. 3B. The peripheral interface 224 accepts signals from the keyboard 206 and other input devices such as a pointing device 236, and transforms the signals into a form suitable for communication on the bus 234. The display interface 222 may comprise a video card or other suitable display interface that accepts information from the bus 234 and transforms it into a form suitable for the display 204. The audio interface 240 may comprise a sound card or other suitable audio interface that accepts information from the bus 234 and transforms it into a form suitable for driving the speaker 242.

The processor 226 gathers information from other system elements, including input data from the peripheral interface 224, and program instructions and other data from non-volatile storage 232 or volatile storage 230, or from other systems (e.g., a server used to store and distribute copies of executable code) coupled to a local area network or a wide area network via the network interface 228. The processor 226 executes the program instructions and processes the data accordingly. The program instructions may further configure the processor 226 to send data to other system elements, such as information presented to the user via the display interface 222 and the display 204, and audio presented to the user via the audio interface 240 and the speaker 242. The network interface 228 enables the processor 226 to communicate with other systems via a network (e.g., network 140 of FIG. 2). Volatile storage 230 may serve as a low-latency temporary store of information for the processor 226, and non-volatile storage 232 may serve as a long term (but higher latency) store of information.

The processor 226, and hence the system configuration 200 as a whole, operates in accordance with one or more programs stored on non-volatile storage 232 or received via the network interface 228. The processor 226 may copy portions of the programs into volatile storage 230 for faster access, and may switch between programs or carry out additional programs in response to user actuation of the input device. The additional programs may be retrieved from non-volatile storage 232 or may be retrieved or received from other locations via the network interface 228. One or more of these programs executes on system configuration 200 causing the configuration to perform at least some of the data collection and data processing functions of processing system 110, as well as the display functions of workstation 130, as disclosed herein.

Although a fully equipped computer system is shown in the illustrative embodiment of FIGS. 3A and 3B, other embodiments comprise fewer options and may be suitable as the workstation 130. At least some embodiments of workstation 130 comprise only some of the hardware features shown in FIGS. 3A and 3B, and only execute the software necessary to provide a user interface for datacenter monitoring software. Such embodiments of workstation 130 are sometimes referred to as a "thin" client. Similarly, at least some embodiments of processing system 110 comprise only some of the hardware features shown in FIGS. 3A and 3B. For example, if processing system 110 is used exclusively as a data collection and database server, keyboard 206, pointing device 236, speaker 242 and display 204 may not be needed. Other embodiments of workstation 130 and processing system 110, with various combinations of hardware features and installed software, will become apparent to those skilled in the art, and all such embodiments of workstation 130 and processing system 110 are within the scope of the present disclosure.

Figure 4:
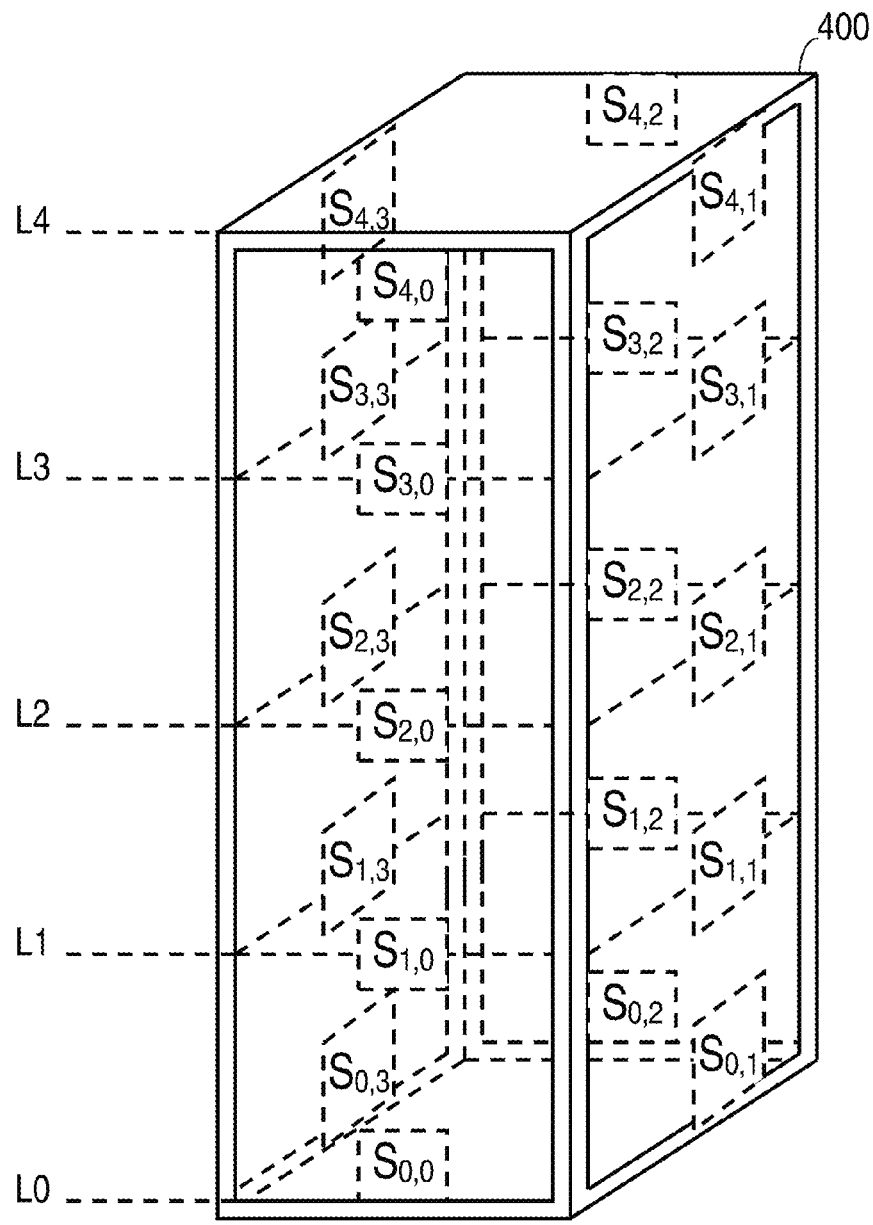
FIG. 4 shows the placement of environmental sensors within an equipment rack or enclosure, in accordance with at least some illustrative embodiments.

In order to present a full 3-D image of the monitored datacenter parameters on the display of workstation 130, at least some sensors need to be distributed in multiple horizontal or X-Y planes, wherein each plane is positioned at a different elevation (i.e., positioned along a vertical Z axis). FIG. 4 shows the placement of the sensors within an equipment rack 400, in accordance with at least some illustrative embodiments. The rack shown has sensors positioned at five distinct elevations within the rack (L0 through L4), with four sensors positioned at each elevation. Each of the four sensors is placed at or near the center of one of the four faces of the rack for a given level. For example, at the L0 level, four sensors $S_{0,0}, S_{0,1}, S_{0,2}$ and $S_{0,3}$ are distributed around the base of the rack near the center of each rack face at that level. Sensors are similarly placed at each of the remaining levels L1 through L4.

Figure 5:
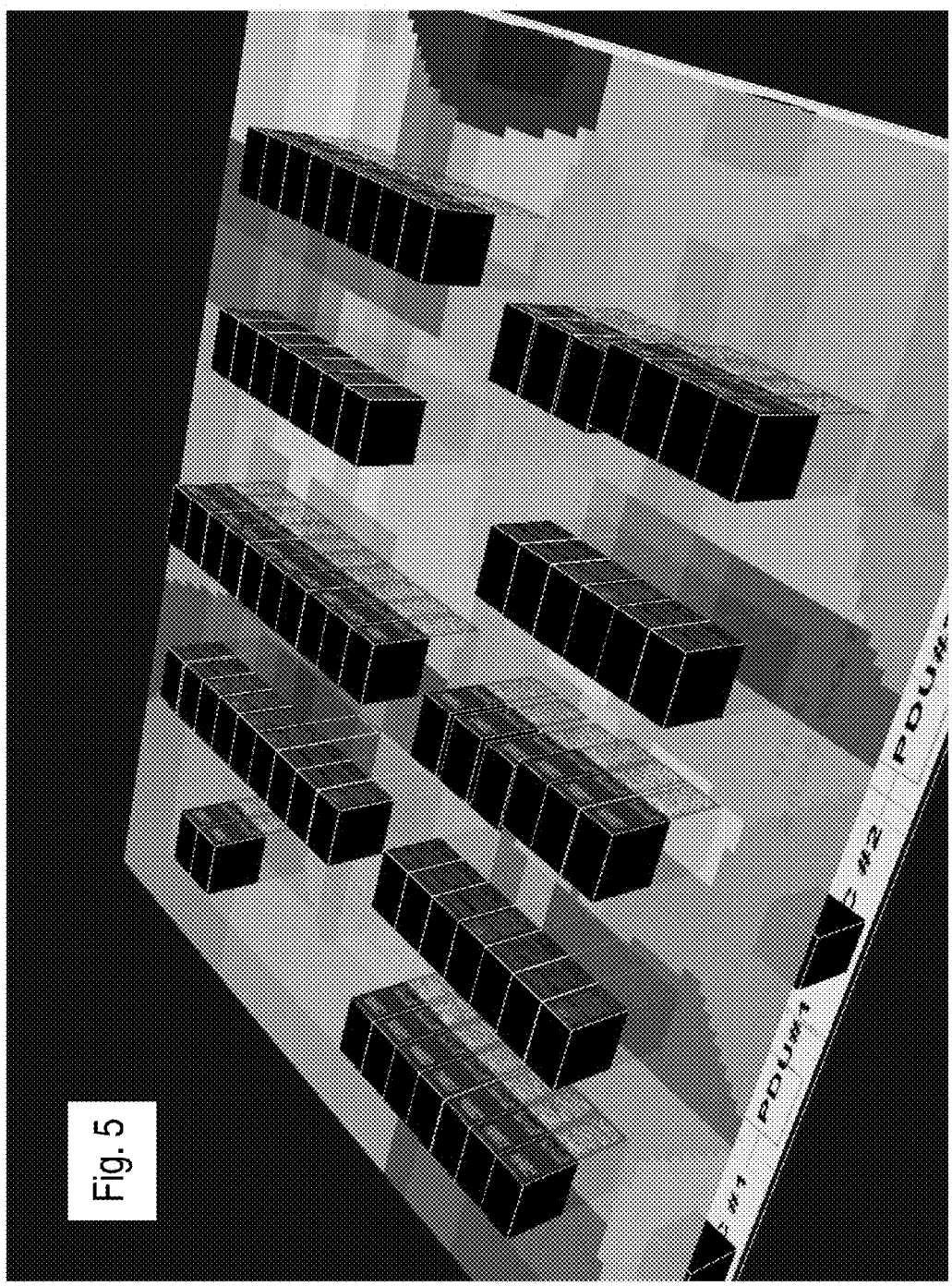
FIG. 5 shows a color 3-dimensional visualization of interpolated environmental data, in accordance with at least some illustrative embodiments.

Data collected from each of the sensors provides a sample point. An interpolated range of values representing the data in the space between adjacent sensors may subsequently be calculated for each set of sampled values, providing the data necessary to display either distinct gradients or regions of colors between points, or a continuously varying gradation of color. The gradations may be displayed along each face of the rack, as shown in FIG. 1, or as gradations in space between racks along a specific plane or elevation, as shown in FIG. 5. Sensors may also be placed under a raised floor, within air handlers, above a raised ceiling, and suspended from the ceiling between racks. Many other sensor positions, gradations and interpolation techniques will become apparent to those skilled in the art, and all such sensor positions, gradations and interpolation techniques are within the scope of the present disclosure.

Although individual, real-time absolute measurements, such as for example temperature measurements, may be displayed, measurements may also be combined to produce other informative 3-D displays. For example, a safe operating range may be defined and only variations above or below the range are shown as color gradations. All values within the safe range are shown as black. In this manner, only those ranges of interest stand out within the 3-D image of the datacenter. Relative measurements, either to a static fixed value, a reference measured value, or a calculated value (e.g., an average, product or ratio) may also be displayed in a similar manner. Many other measurements, calculations and combinations of measurements and calculations will become apparent to those skilled in the art, and all such measurements, calculations and combinations of measurements and calculations are within the scope of the present disclosure.

In each the examples described herein, the 3-D display of the value of interest provides an overall, real-time representation that can be viewed and intuitively interpreted by an operator of the system, allowing the operator to quickly perceive, assess and interpret at a glance what would otherwise be an overwhelming amount of discrete information. The 3-D representation not only represents the individual data points, it graphically represents the relationships between samples, providing a consolidated image of the state of the datacenter in real-time, as well as changes to the state of the datacenter as they occur.

Historic data may also be represented by the 3-D image, either directly in the form of a playback, or in combination with the real-time data. For example, in at least some illustrative embodiments differences between current data and historical data for a similar time period (e.g., the same day of the previous year) or differences with a historical average are highlighted on the display. Snapshots of distinct historical snapshots may also be combined to produce a time-lapse sequence in order to identify anomalies and trends that could be leading up to a problem or equipment failure. In other illustrative embodiments cumulative differences between a real-time value and a series of snapshots are displayed and may be used as a predictor of anomalies or problems. Many other combinations of real-time and historical data will become apparent to those skilled in the art, and all such combinations are within the scope of the present disclosure.

Figure 6:
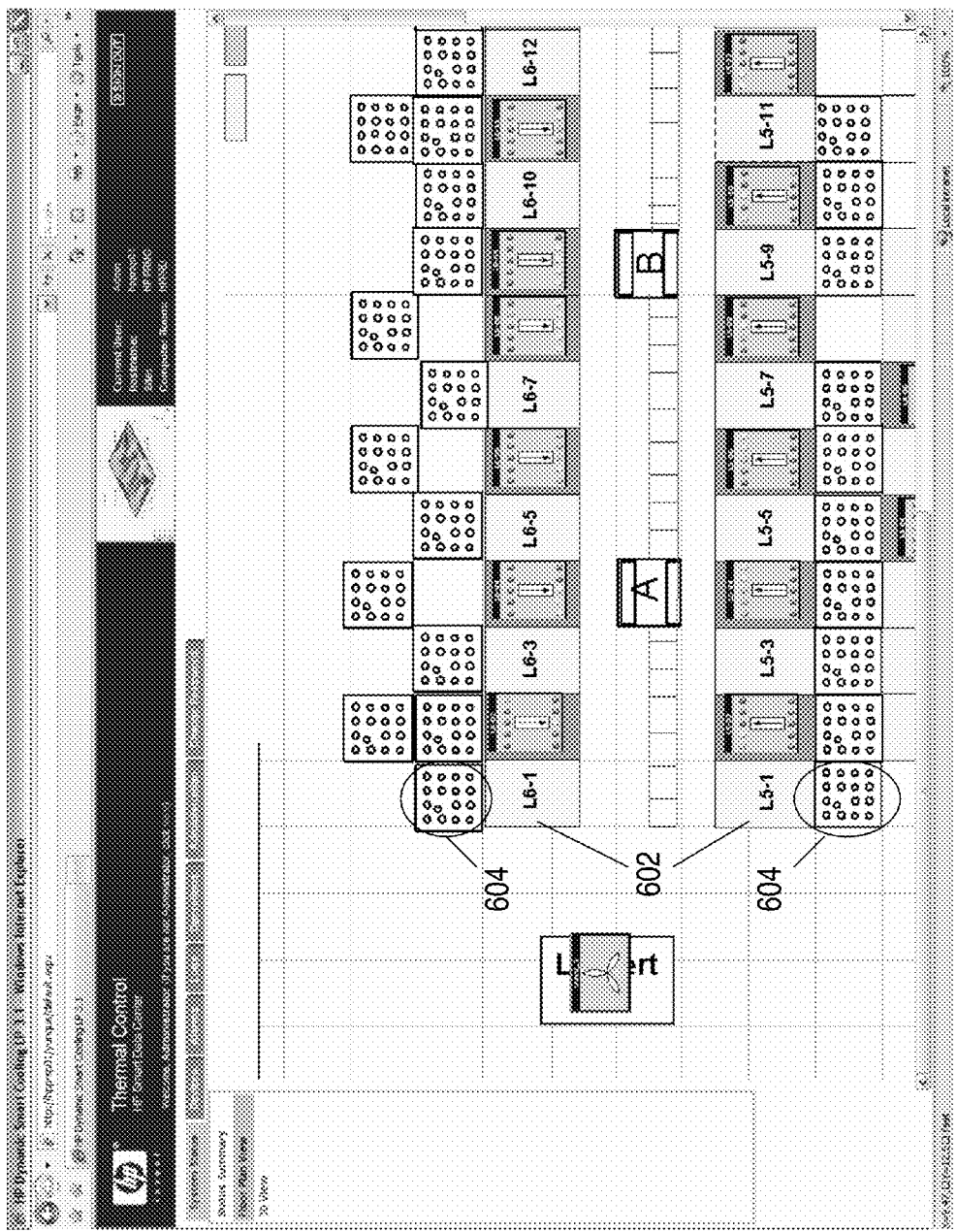
FIG. 6 shows a 2-dimensional representation of a datacenter used as part of a configuration tool, in accordance with at least some illustrative embodiments.

In order to build the 3-D images described, the positions of the sensors (x, y and z) are used. In at least some illustrative embodiments, the coordinates are encoded and stored as part of the configuration of the representation of the datacenter. FIG. 6 shows an example of a 2-dimensional (2-D) representation of the datacenter used as part of a configuration tool operated by a user at workstation 130. Each rack 602 is placed within the floor plan of the datacenter, and each sensor 604 associated with each rack 602 is placed within a square adjacent to the associated rack. An interactive configuration window (not shown) is used to provide the relevant information for each sensor selected, including the position and elevation within the rack. The position information is later combined with the actual sensor data to produce the 3-D images previously described.

Figure 7:
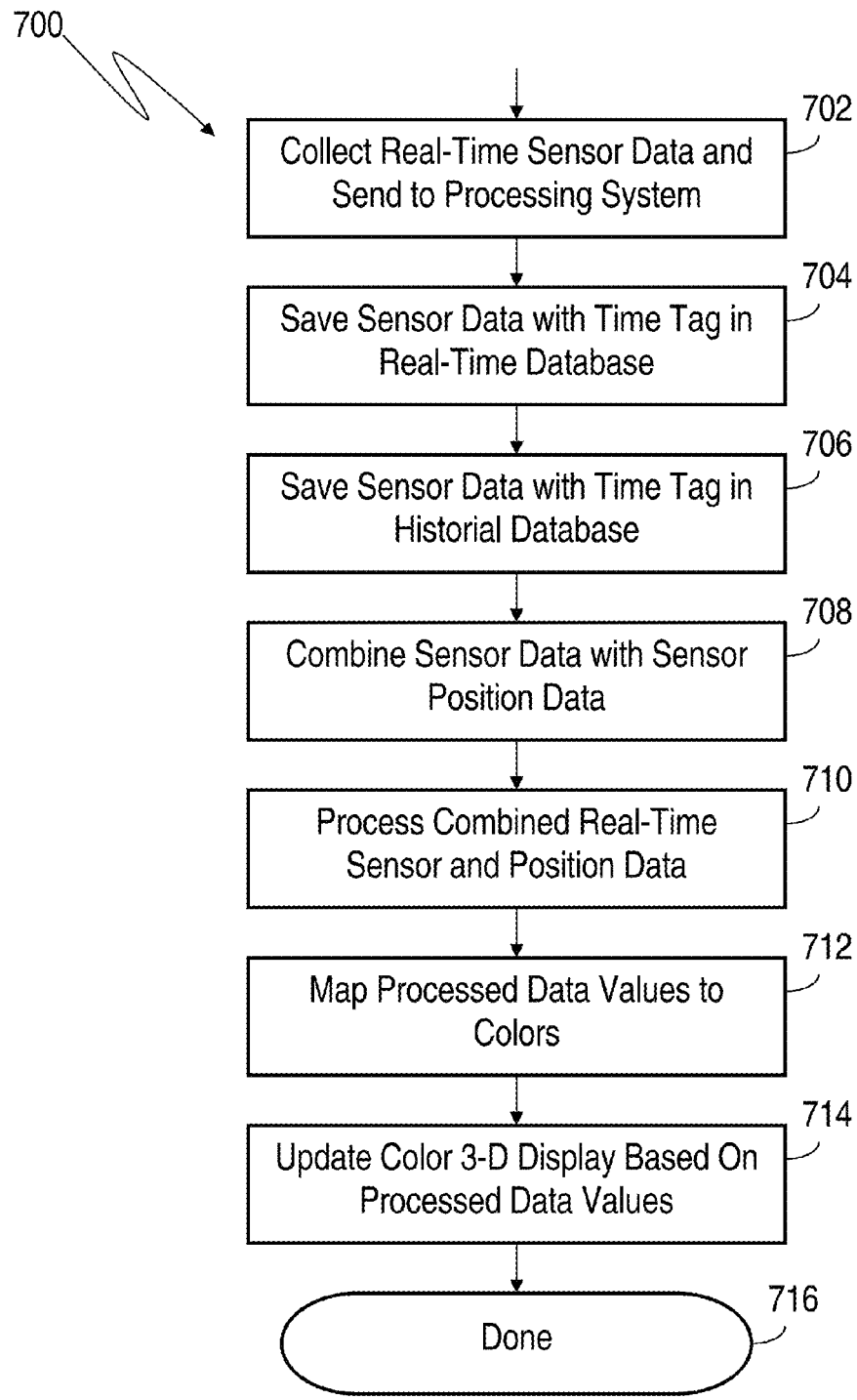
FIG. 7 shows a method for collecting, processing and displaying environmental data using a color 3-dimensional visualization, in accordance with at least some illustrative embodiments.

FIG. 7 shows a method 700 for collecting and displaying datacenter sensor data as a color 3-D image, in accordance with at least some illustrative embodiments. Referring to both FIGS. 2 and 7, real-time data is collected from the network of sensors 150 and transmitted by sensor network interfaces 160 to processing system 110 (block 702). Each data sample is time-tagged and stored as the current value for the corresponding sensor in the real-time database 116 (block 704), and as a time-sequential data point within the historical database 122 (block 706). The real-time data is then combined with sensor location/position data (block 708) previously stored as configuration data.

The combined sensor and position data is then processed by processing system 110 (block 710). Processing may be as simple as forwarding the data for display "as is," or may involve any number of complex calculations, such as derivative, integration and statistical calculations, just to name a few examples. A large variety of calculations are possible, and all such calculations are within the scope of the present disclosure. Once processed, each resulting processed data value is mapped to one of a range of colors (block 712). In at least some illustrative embodiments, the color map is also stored as configuration data. The display at workstation 130 is then updated to reflect the color values of the latest processed data values (block 714), completing the method 700 (block 716).

The above discussion is meant to be illustrative of the principles and various embodiments of the present invention. Numerous variations and modifications will become apparent to those skilled in the art once the above disclosure is fully appreciated. For example, although the illustrative embodiments describe collecting physical and electrical environmental data for display, other parameters that affect the overall operational environment of the datacenter may be sampled, combined and/or displayed. Such parameters may include processing, storage and network utilization, number of detected errors, and general health and status variables provided by the equipment based on periodic self tests, just to name a few examples.

Further, combinations of data samples are not limited to data of the same type, but also may include combinations and calculations between different types of data (e.g., a ratio calculated using a measured temperature and the power consumption of the equipment at that location and elevation, used to identify abnormal heat increases). Also, although the embodiments described utilize color to display and emphasize the data values represented, other illustrative embodiments utilize grayscales in lieu of colors to represent the variations in the data values represented. Thus, the term "colors" as used in the present disclosure includes monochrome grayscales and halftones. It is intended that the following claims be interpreted to embrace all such variations and modifications.

What is claimed is:

1. A method for monitoring a datacenter, comprising:
    collecting a plurality of real-time data samples from a plurality of data sensors;
    generating a plurality of processed data values based at least in part on the plurality of real-time data samples, the processed data values indicating environmental parameter;
    mapping each of the plurality of processed data values to one of a plurality of colors, each color indicating a single value of the environmental parameter;
    displaying the plurality of processed data values as regions of color on a plurality of two-dimensional (2-D) planes within a three-dimensional (3-D) space representing a datacenter;
    interpolating a plurality of values within one of the plurality of 2-D planes in between at least some of the plurality of real-time data samples;
    mapping each of the plurality of interpolated values to one of a plurality of colors, each color indicating the interpolated value; and
    displaying the plurality of interpolated values as regions of color on the plurality of 2-D planes within the 3-D space.

2. The method of claim 1, further comprising displaying 3-D representations of one or more equipment enclosures placed within the datacenter, wherein each of the plurality of 2-D planes corresponds to a displayed surface of the one or more equipment enclosures.

3. The method of claim 1, wherein each of the plurality of 2-D planes corresponds to a distinct horizontal plane located at an elevation level at which at least some of the plurality of sensors are located.

4. The method of claim 1, wherein generating the plurality of processed data values is further based upon a plurality of historical data samples that comprise time-tagged real-time data samples that are time-sequentially stored in a database.

5. The method of claim 1, wherein the generating of the plurality of processed data values is further based upon one or more calculated values.

6. The method of claim 5, further comprising combining at least some of the plurality of real-time data samples to produce the one or more calculated values.

7. The method of claim 5, further comprising:
    time-sequentially storing time-tagged real-time data samples in a database as historical data samples; and
    combining at least some of the plurality of real-time data samples and one or more of a plurality of the historical data samples to produce the one or more calculated values.

8. The method of claim 1, further comprising selecting the real-time data samples from a plurality of data types comprising at least one type selected from the group consisting of temperature data, air flow data, humidity data and power consumption data.

9. A system, comprising:
    a processing system;
    a plurality of sensors coupled to the processing system via a network, the sensors configured to monitor environmental conditions within a datacenter;
    an operator workstation capable of displaying color three-dimensional (3-D) images; and
    one or more equipment racks installed within the datacenter, wherein at least some of the plurality of sensors are installed at multiple elevations within the one or more equipment racks;
    wherein real-time sample data points provided by the plurality of sensors are processed by the processing system to produce one or more processed data values that are mapped to one or more of a plurality of colors, the processed data values indicating an environmental parameter, and each color indicating a single value of the environmental parameter;
    wherein one or more two-dimensional (2-D) planes within a 3-D space representing the datacenter comprise real-time sample data points from one or more of the plurality of sensors and are displayed at the operator workstation as regions of color, the location of a region corresponding to the physical location of the 2-D plane within the 3-D space representing the datacenter, the color of a region reflecting the mapped color of at least some of the one or more processed data values; and wherein the one or more 2-D planes each correspond to a rendered surface of the one or more equipment racks displayed in a color 3-D image by the operator workstation.

10. The system of claim 9, wherein the processing system interpolates a plurality of values within the one or more 2-D planes in between at least some of the real-time sample data points, mapping each of the plurality of interpolated values to one of a plurality of colors, each color indicating the interpolated value; and wherein the plurality of interpolated values are displayed at the operator workstation as regions of color on the one or more 2-D planes within the 3-D space.

11. A non-transitory computer-readable storage medium comprising software that when executed by a computer causes a processor to:

collect a plurality of real-time data samples from a plurality of data sensors;

generate a plurality of processed data values based at least in part on the plurality of real-time data samples, the processed data values indicate an environmental parameter;

map each of the plurality of processed data values to one of a plurality of colors, each color indicating a single value of the environmental parameter; and display the plurality of processed data values as regions of color on a plurality of two-dimensional (2-D) planes within a three-dimensional (3-D) space representing a datacenter.

12. The non-transitory computer-readable storage medium of claim 11, wherein the software when executed by the computer further causes the processor to display 3-D representations of one or more equipment enclosures placed within the datacenter, wherein each of the plurality of 2-D planes corresponds to a displayed surface of the one or more equipment enclosures.

13. The non-transitory computer-readable storage medium of claim 11, wherein each of the plurality of 2-D planes corresponds to a horizontal plane located at an elevation level at which at least some of the plurality of sensors are located.

14. The non-transitory computer-readable storage medium of claim 11, wherein the software when executed by the computer further causes the processor to:

interpolate a plurality of values within one of the plurality of 2-D planes in between at least some of the plurality of real-time data samples;

map each of the plurality of interpolated values to one of a plurality of colors, each color indicating the interpolated value; and display the plurality of interpolated values as regions of color on the plurality of 2-D planes within the 3-D space.

15. The non-transitory computer-readable storage medium of claim 11, wherein causing the processor to generate the plurality of processed data values is further based upon a plurality of historical data samples that comprise time-tagged real-time data samples that are time-sequentially stored in a database.

16. The non-transitory computer-readable storage medium of claim 11, wherein causing the processor to generate the plurality of processed data values is further based upon one or more calculated values.

17. The non-transitory computer-readable storage medium of claim 16, wherein the software when executed by the computer further causes the processor to combine at least some of the plurality of real-time data samples to produce the one or more calculated values.

18. The non-transitory computer-readable storage medium of claim 16, wherein the software when executed by the computer further causes the processor to:

time-sequentially store time-tagged real-time data samples in a database as historical data samples; and combine at least some of the plurality of real-time data samples and one or more of a plurality of the historical data samples to produce the one or more calculated values.

* * * * *

UNITED STATES PATENT AND TRADEMARK OFFICE
CERTIFICATE OF CORRECTION

PATENT NO.        : 9,251,608 B2
APPLICATION NO.   : 11/742019
DATED             : February 2, 2016
INVENTOR(S)       : Luis Chardon et al.

It is certified that error appears in the above-identified patent and that said Letters Patent is hereby corrected as shown below:

Claims

In column 8, line 2, in Claim 1, delete "(2 -D)" and insert -- (2-D) --, therefor.

In column 8, line 3, in Claim 1, delete "(3 -D)" and insert -- (3-D) --, therefor.

In column 8, line 6, in Claim 1, delete "2 -D" and insert -- 2-D --, therefor.

In column 8, line 12, in Claim 1, delete "2 -D" and insert -- 2-D --, therefor.

In column 8, line 12, in Claim 1, delete "3 -D" and insert -- 3-D --, therefor.

In column 8, lines 14-15, in Claim 2, delete "3 -D" and insert -- 3-D --, therefor.

Signed and Sealed this
Twenty-fourth Day of May, 2016

Michelle K. Lee
*Director of the United States Patent and Trademark Office*